United States Patent Office 3,452,106
Patented June 24, 1969

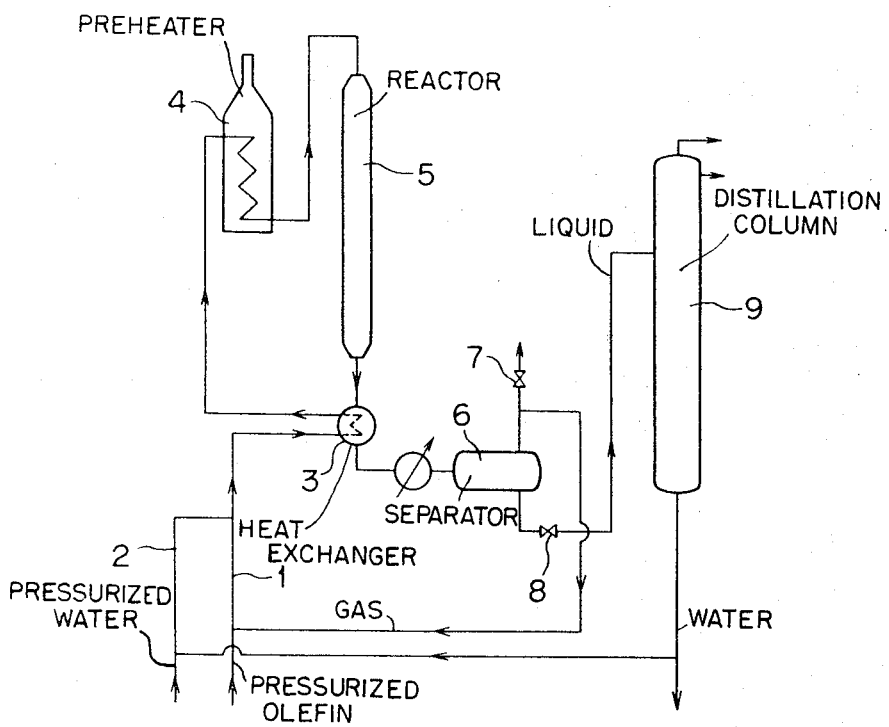

3,452,106
PROCESS FOR MANUFACTURING ALCOHOL BY DIRECT CATALYTIC HYDRATION OF OLEFINS
Fukuzo Sato, Yokohama-shi, Akio Okagami, Tokyo, and Toshihiro Ueno, Chigasaki-shi, Japan, assignors to Japan Gasoline Co., Ltd., Tokyo, Japan, a corporation of Japan
Filed May 20, 1966, Ser. No. 551,644
Claims priority, application Japan, May 27, 1965, 40/31,211
Int. Cl. C07c 29/04
U.S. Cl. 260—641
9 Claims

ABSTRACT OF THE DISCLOSURE

A process for the hydration of an olefin to the corresponding alcohol by passing the olefin together with liquid water over a catalyst at a temperature of 160°–360° C., a pressure of 200–500 atmospheres gauge, an LHSV of olefin of 0.1–3.0 (m.$^3$/m.$^3$ hr.) and a liquid velocity of over 1.0 (m.$^3$/m.$^2$ hr.). The catalyst consists substantially of a blue oxide of tungsten and an oxide of chromium as a binding agent corresponding to a chromic oxide content of 5%–50% by weight of the total weight of the catalyst.

---

The present invention relates to a process for manufacturing alcohol by direct catalytic hydration of olefins in the presence of liquid state water.

Oxides of tungsten, solid phosphoric acid or heteropolyacids, such as silico-tungstic acid, are known as solid catalysts for use in the hydration of olefins. Of these solid catalysts, solid phosphoric acid and heteropolyacids are readily soluble in water, and therefore, the hydration which is carried out by the use of these catalysts calls for particular reaction conditions such that there should exist no liquid phase in the reaction zone and that the reaction should be carried out under a low pressure and at a high temperature. Such restrictions in the conditions of reaction which are encountered where the aforesaid catalysts are used, require the operation to be conducted under a condition which is in fact thermodynamically disadvantageous for alcohol synthesis. Since an operation which is conducted under a low pressure, in particular, leads to a reduced reaction rate, it is mandatory that the catalyst used have a highly increased activity to achieve an efficient hydration. While, on the other hand, an oxide of tungsten has an activity which is generally lower than that of such catalyst as solid phosphoric acid, the former is advantageous because it can be used, because of its limited solubility, under a high pressure-temperature condition which involves the existence of a liquid phase in the reaction zone. Oxides of tungsten are characterized in that their relatively low activity is compensated for by their increased equilibrium conversion due to the reaction pressure being high. However, the above-mentioned catalysts which have been heretofore used generally have the property of softening, disintegrating or pulverizing when used in a liquid phase reaction under a high pressure, and such catalysts do not withstand an extended duration of use. Efforts have been directed to the improvement of these defects of such catalysts. These prior efforts include, for example, the enhancement of their strength by pelleting the catalysts under a high pressure of, say, 100 tons per square inch, and also to the prevention of the pulverization of catalysts which would occur during their use, by dehydrating the catalysts by subjecting them to prolonged heating prior to being used, and further to an attempt to improve such defects of the oxides of tungsten by, for example, mixing an oxide of tungsten with a high polymer compound such as tetrafluoroethylene as a binding agent. These prior procedures, however, were accompanied by several disadvantages including the difficulty in the pelleting of catalysts, the intricacy and troublesomeness encountered in the heat-treatment of catalysts, and the disadvantage that the catalyst containing tetrafluoroethylene as the binding agent can be used only at a temperature lower than the decomposition temperature of the binder.

In addition to the above, a reaction method of the suspension type which uses an oxide of tungsten in the form of powder, has been also proposed. This method, however, was defective in that it required a complicated reactor type plus complicated procedures in separating the catalyst from the liquid products after reaction.

The present invention improves the foregoing drawbacks inherent to the known catalysts as those described above, and accomplishes the object of enhancing the mechanical strength of the tungsten oxide catalysts by the use of a novel procedure of using an oxide of chromium as the binding agent, without affecting the activity of catalyst in any way.

According to the present invention, there is provided a process for manufacturing alcohol corresponding to the olefin from which said alcohol is obtained, said olefin having not more than four carbon atoms, by hydrating said olefin in the presence of a catalyst comprising a blue oxide of tungsten and also an oxide of chromium which is a binder equivalent to a chromic oxide content ranging from 5% to 50%, preferably 10% to 30% by weight, of the total weight of a final catalyst, under the following conditions: a temperature ranging from 160° C. to 360° C., the pressure ranging from 200 to 500 atms., the LHSV of olefin ranging from 0.1 to 3.0 (m.$^3$/m.$^3$ hr.) and a liquid velocity of 1.0 or more (m.$^3$/m.$^2$ hr.), preferably between 1.0 and 25 (m$^3$/m.$^2$ hr.).

The method of preparing the catalyst will now be described in further detail. One example comprises the steps of: mixing an oxide of tungsten obtained from a material such as ammonium paratungstate after removal of ammonium by heat-treatment, or a commercial tungstic acid, with an oxygen containing chromium compound corresponding to a chromic oxide content ranging from 5% to 50%, preferably from 10% to 30%, by weight, of the total weight of the final catalyst; kneading the mixture; drying, pelleting and calcining pellets of the catalyst. Another method comprises the steps of: dissolving a material such as ammonium paratungstate in an acid solution prepared so as to have a pH value ranging from 0 to 4.0 to precipitate a hydrate of tungstic acid; filtering and washing the resulting precipitates; mixing the prepiciptates with an oxygen containing chromium compound of an amount identical to that mentioned in the aforementioned example and kneading the mixture; drying and pelleting the kneaded mixture into a final catalyst.

The component material of the catalyst which is used in the present invention includes oxygen containing tungsten compounds such as tungstic acids or ammonium paratungstate. The oxygen containing tungsten compounds used in the present invention may be such ones that can be eventually converted into oxides of tungsten, and therefore, no strict selection of the starting materials is necessary. It is preferred, however, that such starting material be subjected to heat-treatment or acid-treatment to convert the material into an oxide of tungsten or into a hydrate of tungstic acid, prior to mixing the material with an oxygen containing chromium compound such as chromic anhydride and kneading them. The heating method comprises heating the powder of, for example, ammonium paratungstate uniformly to a temperature ranging from 250° C. to 350° C. The method of acid-treatment is represented by dissolving a tungstate in an aqueous solution of an inorganic acid such as hydrochloric acid or nitric acid to produce precipitates of hydrates of tungstic acid. Said acid solution is prepared so as to have a pH value ranging from 0 to 4.0, preferably from 0 to 1.0. This acid solution is then added with a tungstate corresponding to tungsten trioxide of an amount ranging from 5 to 20 grams per 100 ml. of the acid solution, and the mixture is stirred thoroughly while maintaining the mixture constantly at a temperature in the range from 0° to 60° C. The precipitates of the hydrate of tungstic acid are then filtered and washed with a diluted acid solution. When a commercial tungstic acid or a powdered oxide of tungsten is used, no special pretreatment is necessary.

The oxide of tungsten or the hydrate of tungstic acid obtained in the aforesaid manner is then mixed with an oxygen containing chromium compound equivalent to a chromic oxide content ranging from 5% to 50%, by weight, of the total weight of the final catalyst and the mixture is kneaded, together with a small amount of water, if necessary. The thoroughly kneaded mixture is then dried at a temperature ranging from 105° to 120° C. to pulverize it and the resulting powder is added with graphite of an amount ranging from 2 to 4 percent by weight, the latter serving as the pelleting lubricant. Thereafter, the mixture is pelleted under a pressure in the range from 2 to 10 tons per square centimeter, and this process is followed by calcining, to form a final catalyst. The pelleting does not have to be performed under a pressure as high as 16 tons per square centimeter as is noted in the prior literatures, nor does it require such complicated procedures as are represented by a preliminary pelleting under a low pressure, crushing the pellets, and re-pelleting it under a high pressure. In some cases, a catalyst may be prepared by a simple procedure comprising the steps of mixing the oxide of tungsten or the hydrate of tungstic acid with an oxygen containing chromium compound, subjecting the mixture to extrusion, and calcining the pellets.

The calcination of catalyst has an advantage that the soluble oxide of chromium is converted to an insoluble chromic oxide and also an advantage that the activity of the catalyst is enhanced because the small amount of residual ammonium in the catalyst is removed by the calcination. The catalysts are, in general, calcined at a temperature of 1000° C. or less, preferably in the range from 300° C. to 600° C. The present invention does not require such a rigid calcination condition as is noted in the prior literature which suggests a heating-up rate of 1.5° C. per minute and a cooling-down rate of 3° C. per minute. In the present invention, the temperature is elevated at the rate of from 5° C. to 10° C. per minute before the required level of temperature is reached. Upon the required temperature having been attained, this temperature is thereafter maintained for 3 to 20 consecutive hours. And then the catalyst is cooled down to room temperature at the rate of from 10° C. to 20° C. per minute.

The reduction of an oxide of tungsten to a lower valency state may be conducted in a hydrogen gas or in the vapor of aliphatic alcohol having 4 carbons or less. The lower valency state attained by the reduction should correspond to the blue oxide of tungsten. According to the present invention, an oxide of chromium used as a binder increases the mechanical strength of the catalyst without any deleterious effect on the activity of the catalyst. When a reaction is performed under the reaction conditions used in the present invention by the use of silica gel as the catalyst carrier, the silica gel dissolves in the pure water at the rate of as much as 150 grams to 200 grams per ton of pure water, resulting in the eventual disintegration of the catalyst, while on the other hand chromic oxide dissolves in the order of only about 0.2 gram per ton of pure water, and this limited solubility contributes to a greatly increased mechanical strength of the catalyst during the hydration process as compared with the strength obtained from the use of a conventional catalyst.

In the manufacture of an alcohol by hydration of an olefin in the presence of the aforesaid catalyst, the effect of such catalyst is remarkably enhanced when it is used under a particular condition wherein liquid-state water is present under the conditions of a high temperature and a high pressure. Therefore, it is necessary that the reaction temperature, the pressure and the water-to-olefin mol ratio be selected so as to permit a portion of water to exist in a liquid state in the reaction zone. In addition, it is mandatory that the surface of the catalyst be always wet with water. If it is not wet, the activity of the catalyst will be reduced and will cause a reduced selectivity. As a consequence, a reduction in the water-to-olefin mol ratio and a reduction in the liquid velocity will result in a decrease in both the activity and the selectivity of the catalyst.

By the use of the catalyst of the present invention and by adopting an appropriate water-to-olefin mol ratio and an appropriate liquid velocity, a much higher activity and a much higher selectivity than those reported in the prior literatures were obtained. Ethylene may be reacted with water at a temperature in the range from 260° C. to 360° C. and under a pressure within the range from 200 to 500 atmospheres to produce alcohol and propylene may be hydrated to isopropanol with water at a temperature ranging from 240° C. to 300° C. and also at an elevated pressure. $C_4$ olefins may also be hydrated to corresponding alcohols with water at a properly elevated temperature and pressure.

In the present invention, the alcohol thus produced is obtained in the form of an aqueous solution. In order to obtain a final product alcohol, however, it is necessary that the reaction product is introduced further to a distillation column for being separated into alcohol and water. During such process, a portion or all of the water withdrawn from the bottom of the distillation column may be recycled to the reaction zone.

Some of the advantages from the recycling of water are enumerated as follows.

(1) In the present invention, the equilibrium conversion of the olefin is so high that the existence of a small amount of alcohol in the feed water hardly affects the conversion of the olefin. Therefore, there is no need of withdrawing all of the distilled alcohol from the top of the distillation column, but a small amount of alcohol may exist in the recycled water. This permits the number of theoretical plates of the still to be decreased.

(2) An oxide of tungsten which constitutes the catalyst partly dissolves in the liquid phase under the conditions of the present invention, namely, in the order of about 30 grams per ton of pure water. Now, chromic oxide dissolves in the order of only about 0.2 gram per ton of pure water, and therefore, this should impart no adverse effect on the mechanical strength of the catalyst. The dissolution of the oxide of tungsten in the order of about 30 grams does not abruptly affect the conversion of the olefin, but the catalyst will lose its activity gradually from the upper portion of the catalyst bed. Advantageously, however, due to the recycled water the rate of dissolution of the oxide of tungsten decreases to about 2 grams per ton of the passing liquid. As a consequence, the loss of the catalyst component becomes $\frac{1}{15}$ of the amount of the loss noted in the non-recycle system, and thus a stable operation for an extended duration is realized.

(3) The quantity of the feed pure water is saved. The single figure of the accompanying drawing illustrates a plant which may be used for conducting the process of the invention. The olefin which has been pressurized up to a desired reaction pressure is introduced into the system through a pipe 1, while similarly pressurized water is introduced into the system through a pipe 2, and they are passed through a heat exchanger 3 and a preheater 4 for being preheated, and thereafter, they are fed to a reactor 5. The reaction product withdrawn from the reactor 5 is separated into gas and liquid in a separator 6 which may be a high pressure separator, and the separated gas and liquid are depressurized at the valves 7 and 8, respectively. An unreacted olefin after separation may be recycled to the system. The liquid after being separated from the gas is introduced to a distillation column 9 where alcohol is separated from water. The separated water is withdrawn from the bottom of the column and is recycled to the system.

Description will now be made on some of the preferred embodiments of the present invention simply by way of example.

EXAMPLE 1

500 grams of commercial ammonium paratungstate were heated uniformly at 300° C. for 2 hours in air to remove ammonium therefrom and to convert them into an oxide of tungsten. The latter was then mixed with 66 grams of commercial chromic anhydride. The mixture was added with a small amount of water and was kneaded thoroughly. The kneaded mass was dried for 5 hours at 110° C. The powder of the mixture thus obtained was then screened to collect particles of 100 mesh or less, and the collected powder was added with graphite of an amount 4% by weight. The resulting mixture was pelleted into 3 mm. x 3 mm. under the pressure of about 6 tons per square centimeter. The pelleting machine used was capable of molding 2 pellets at a time and the rate of molding was 40 pellets per minute. The content of chromic oxide in the catalyst was 10% by weight. This catalyst was calcined at 600° C. for 3 hours while passing air therethrough. The temperature was elevated at the rate of 10° C. per minute. 100 ml. of the resulting catalyst was charged into a high pressure reaction tube having an internal diameter of 10 mm. The tungsten trioxide ($WO_3$) is reduced to an oxide of a lower valency by passing through the reactor a mixed gas comprising 5 volumes of hydrogen and 95 volumes of nitrogen at a flow rate of 300 l. per hour for 2 hours under the atmospheric pressure and at 450° C., thereafter passing only hydrogen gas therethrough under the aforesaid conditions for 6 hours. Subsequently, hydration of ethylene was conducted unde the conditions comprising: the outlet pressure of 270 atms., the average reaction temperature of 335° C., the LHSV of ethylene of 0.46 volume per volume of catalyst, and the liquid velocity of 4.22 (m.$^3$/m.$^2$ hr.). The conversion of ethylene to ethanol was 22.7%.

EXAMPLE 2

A catalyst (2–A) was prepared by performing pyrolysis of commercial ammonium paratungstate in just the same manner as that used in Example 1, thereafter adding chromic anhydrate and processing the mixture under the same conditions as those used in the preceding example so as to obtain a chromic oxide content of 20% by weight, and by pelleting the mixture in the same pelleting machine. Another catalyst (2–B) was prepared in completely the same manner and conditions as those in Example 1, excepting for the absence of chromic oxide in the catalyst. The compressive strengths of these two catalysts were determined after they were calcined at 300° C. for 18 hours and reduced at 480° C. under the same conditions as were used in Example 1. Also, 100 ml. each of these catalysts were charged into high pressure reaction tubes having an inner diameter of 10 mm., respectively. Hydration of ethylene was conducted on each catalyst at the outlet pressure of 320 atms., at the average reaction temperature of 340° C., at the LHSV of ethylene of 0.36 (m.$^3$/m.$^3$ hr.) and at the liquid velocity of 4.98 (m.$^3$/m.$^2$ hr.). Also, the compressive strengths of both catalysts after a predetermined duration of reaction were determined. These data are shown in the following Table 1.

TABLE 1

| | Compressive strength immediately after reduction | Compressive strength after reaction of 600 hours | Conversion of ethylene to ethanol | Selectivity |
|---|---|---|---|---|
| 2–A | 12.3 kg./sample | 5.7 kg./sample | 77.4% | 97% |
| 2–B | Unpelletable | | | |

EXAMPLE 3

450 grams of commercial ammonium paratungstate was dissolved, by stirring, in 3600 ml. of aqueous hydrochloric acid solution having a pH value of 0 and being maintained at 30° C. The precipitates of the hydrates of tungstic acid were filtered and then washed with 0.5% aqueous hydrochloric acid solution and further with pure water. The resulting hydrate of tungstic acid was divided into two equal parts. One of them was kneaded with 66 grams of chromic anhydride and then was dried at 110° C. for 5 hours. The resultant product contained chromic oxide in an amount of 20% by weight. The other part was directly dried at 110° C. for 5 hours. The powder of the respective mixtures was screened to collect particles of 100 mesh or less, respectively. Thereafter, each part was added with graphite of an amount 4% by weight. Then, the respective mixtures were pelleted into 3 mm. x 3 mm. with the same pelleting machine under the same conditions as were used in Example 1 and under the pressure of 6 tons per square centimeter. Calcination and reduction of the catalysts were conducted under the same conditions as those described in Example 2. The catalyst containing chromic acid was designated as (3–A), while the catalyst containing no chromic acid was designated as (3–B). Their compressive strengths were determined immediately after the reduction and also after using them in the hydration of ethylene which lasted for a predetermined length of time. The hydration was conducted under the following conditions, namely, the outlet pressure of 270 atms., the average reaction temperature of 330° C., the LHSV of ethylene of 0.40 (m.$^3$/m.$^3$ hr.), and the liquid velocity of 4.04 (m.$^3$/m.$^2$ hr.). The result of the test is shown in the following Table 2.

TABLE 2

| | Compressive strength immediately after reduction | Compressive strength after reaction of 600 hours | Conversion of ethylene to ethanol | Selectivity |
|---|---|---|---|---|
| 3–A | 18.0 kg./sample | 8.6 kg./sample | 53.7% | 96% |
| 3–B | Unpelletable | | | |

EXAMPLE 4

Hydration of propylene was conducted on the catalyst (2–A) having a chromic oxide content of 20% by weight, said catalyst being prepared by the mixing and pelleting process conducted in just the same manner as that in Example 2 and which was calcined and reduced under the same conditions. The hydration conditions were: the outlet pressure of 250 atms., the average reaction temperature of 250° C., the LHSV of propylene of 1.0 (m.$^3$/m.$^3$ hr.), and the liquid velocity of 4.46 (m.$^3$/m.$^2$ hr.). The conversion of propylene to isopropanol was 48.0%, and the selectivity was 95%.

The embodiments of the invention is which an exclusive property or privilege is claimed are defined as follows:

1. A process for the direct hydration of olefin to the corresponding alcohol which comprises continuously passing olefin containing not more than four carbon atoms together with water over a catalyst at a temperature between 160° C. to 360° C., a pressure between 200 to 500 atmospheres gauge, a liquid hourly space velocity of olefin per volume of catalyst of from 0.1 to 3.0 (m.$^3$/m.$^3$ hr.) and a liquid velocity of over 1.0 (m.$^3$/m.$^2$ hr.), said water being at least partially in the liquid phase, said catalyst being in pellet form and consisting essentially of a blue oxide of tungsten and an oxide of chromium equivalent to a chromic oxide content ranging from 5 percent to 50 percent by weight of the total weight of the catalyst, the blue oxide of tungsten being the active component of the catalyst and the oxide of chromium being present as a binding agent for the blue oxide of tungsten, said catalyst having been prepared by mixing a tungsten compound selected from the group consisting of an oxide of tungsten and a hydrate of tungstic acid with an oxide of chromium, drying the mixture at a temperature of from 105° C. to 120° C., pelletizing the mixture, calcining the pellets at a temperature of from 300° to 1000° C. and then treating the pellets to convert the tungsten compound to the blue oxide of tungsten.

2. A process according to claim 1 wherein said chromic oxide is present in an amount from 10 percent to 30 percent by weight of the total weight of the catalyst.

3. A process according to claim 1 wherein the reaction product stream containing alcohol is subjected to distillation to recover said alcohol from the top of the still and a portion or all of the water withdrawn from the bottom of the still is recycled to the system.

4. A process according to claim 1 wherein said olefin is ethylene.

5. A process according to claim 4 wherein the temperature is between 260° C. to 360° C.

6. A process according to claim 1 wherein said olefin is propylene.

7. A process according to claim 6 wherein the temperature is between 240° C. to 300° C.

8. A process according to claim 1 wherein the pressure is between 250 to 350 atmospheres gauge.

9. A process according to claim 1 wherein said hydration is carried out under conditions such that the water in the reaction zone is partly in the liquid state and partly in the vapor state.

References Cited

UNITED STATES PATENTS

| 1,873,536 | 8/1932 | Brown et al. | 260—641 |
| 2,531,284 | 11/1950 | Levy et al. | 260—641 |
| 2,536,768 | 1/1951 | Reynolds et al. | 260—641 |
| 2,683,753 | 7/1954 | Levy et al. | 260—641 |
| 2,855,370 | 10/1958 | Lundsted | 252—467 |
| 3,198,752 | 8/1965 | Bridger et al. | 252—467 |
| 2,807,655 | 9/1957 | Pitwell | 252—477 |
| 2,963,448 | 12/1960 | Ray | 252—477 |
| 3,051,662 | 8/1962 | Pitzer et al. | 252—477 |

FOREIGN PATENTS 691,360   5/1953   Great Britain.

BERNARD HELFIN, *Primary Examiner.*

J. E. EVANS, *Assistant Examiner.*

U.S. Cl. X.R.

252—467